United States Patent
Morovic et al.

(10) Patent No.: US 8,428,371 B2
(45) Date of Patent: Apr. 23, 2013

(54) METHOD AND SYSTEM TO DETERMINE WHETHER AN IMAGE INCLUDES SPATIAL ADJUSTMENTS

(75) Inventors: Peter Morovic, Barcelona (ES); Marti Maria Saquer, Girona (ES); Jordi Arnabat Benedicto, Tarragona (ES); Jan Morovic, Colchester (GB); Manuel Angel Albarran Moyo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 12/876,973

(22) Filed: Sep. 7, 2010

(65) Prior Publication Data
US 2012/0057781 A1 Mar. 8, 2012

(51) Int. Cl.
*G06K 9/68* (2006.01)
(52) U.S. Cl.
USPC ............ 382/218; 382/164; 382/167; 382/195
(58) Field of Classification Search .................. 382/164, 382/167, 190, 195
See application file for complete search history.

(56) References Cited

U.S. PATENT DOCUMENTS

| | | | |
|---|---|---|---|
| 5,552,904 A * | 9/1996 | Ryoo et al. ............... 358/518 |
| 6,154,577 A | 11/2000 | Warnick et al. | |
| 6,944,358 B2 * | 9/2005 | Morimoto et al. ........... 382/304 |
| 7,355,746 B2 * | 4/2008 | Murray et al. ................ 358/1.9 |
| 7,889,929 B2 * | 2/2011 | Ashikaga ..................... 382/195 |
| 8,081,254 B2 * | 12/2011 | Nanu et al. ................... 348/370 |
| 2004/0114796 A1 * | 6/2004 | Kaku ............................ 382/165 |
| 2006/0257026 A1 * | 11/2006 | Shiffer et al. ................ 382/190 |
| 2007/0195345 A1 * | 8/2007 | Martinez et al. .............. 358/1.9 |
| 2008/0158246 A1 * | 7/2008 | Ishii et al. .................... 345/604 |
| 2010/0046033 A1 | 2/2010 | Kulkarni et al. | |
| 2010/0232694 A1 * | 9/2010 | Oicherman et al. .......... 382/167 |
| 2010/0303345 A1 * | 12/2010 | Reid et al. ..................... 382/163 |
| 2012/0057781 A1 * | 3/2012 | Morovic et al. .............. 382/164 |
| 2012/0057785 A1 * | 3/2012 | Morovic et al. .............. 382/167 |

FOREIGN PATENT DOCUMENTS

| | | |
|---|---|---|
| JP | 2000242795 A | 9/2000 |
| JP | 2009253933 A | 10/2009 |
| WO | WO2008009656 A1 | 1/2008 |

* cited by examiner

Primary Examiner — Gregory M Desire

(57) ABSTRACT

The present disclosure provides a computer-implemented method of identifying spatial image modifications. The method includes receiving a original image and a adjusted image. The method also includes identifying a first subset of pixels comprising pixels in the original image that have a same first color value. The method also includes determining whether a second subset of pixels in the adjusted image all have a same second color value, wherein the second subset of pixels spatially correspond with the first subset of pixels. A spatial adjustment is identified if the second subset of pixels do not all have the same second color value.

20 Claims, 3 Drawing Sheets

METHOD AND SYSTEM TO DETERMINE WHETHER AN IMAGE INCLUDES SPATIAL ADJUSTMENTS

BACKGROUND

Image editing tools such as Photoshop® enable a user to introduce a variety of image adjustments to encoded visual images. For example, a user may adjust an image by altering the colors of the image, such as by changing the hue, saturation level, contrast, exposure, or tone curves to suit the user's preferences. Such color modifications may be global, meaning that the color modifications are applied to the entire color space of the image. A user may also apply spatial adjustments, which are applied to only a portion of the image rather than the image as a whole. For example, a spatial adjustment may include red-eye reduction, air-brushing, or any other adjustment that is applied to a subset of pixels of the original image.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Embodiments of the present invention provide a method of determining whether a second image contains spatial adjustments relative to a first image. In accordance with embodiments, two bitmapped images may be compared to determine possible spatial color differences between the two images. The first image may be referred to herein as an "original image." The second image may be referred to herein as an "adjusted image," and may have been derived from the original image by making certain color adjustments to the original image. However, it should be noted that the techniques described herein may be performed on any two images with the same pixel dimensions regardless of whether one is a derivative of the other.

The detection of spatial adjustments may have various applications. For example, the detection of spatial adjustments may be used as part of an algorithm for modifying a color lookup table. In such an embodiment, color differences between the original image and adjusted image may be extracted and used to modify the color lookup table in accordance with the user's color adjustments. The modified color lookup table may then be used to provide consistent and repeatable color reproduction that exhibits the user's color preferences. Techniques for modifying a color lookup table are described in the co-pending, commonly assigned patent application Ser. No. 12/876,939, titled "Method and System to Modify a Color Lookup Table" by Morovic et al., filed on Sep. 7, 2010, which is hereby incorporated by reference in its entirety for all purposes. According to such techniques for modifying a color lookup table, a spatial color adjustment may cause the color lookup table to be modified in a way that does not capture the user's intended preferences for color reproduction. Thus, a check for spatial color adjustments may be performed to improve the likelihood that all of the color adjustments between the two images are spatially global, meaning that the color modifications are applied independently of the image content.

In another embodiment, the detection of spatial adjustments may be used to determine whether an image has been substantively altered, such as to change to content or information contained in the image. A substantive alteration may indicate that an image has been falsified. A simple comparison of the color values of each pixel may be inadequate to detect substantive alterations due to the fact that global color modifications will also likely change the values of at least some pixels. Such global color changes may not indicate that an image was substantively altered. However, the detection of spatial adjustments may indicate that a portion of an image was substantively altered.

Figure 1:
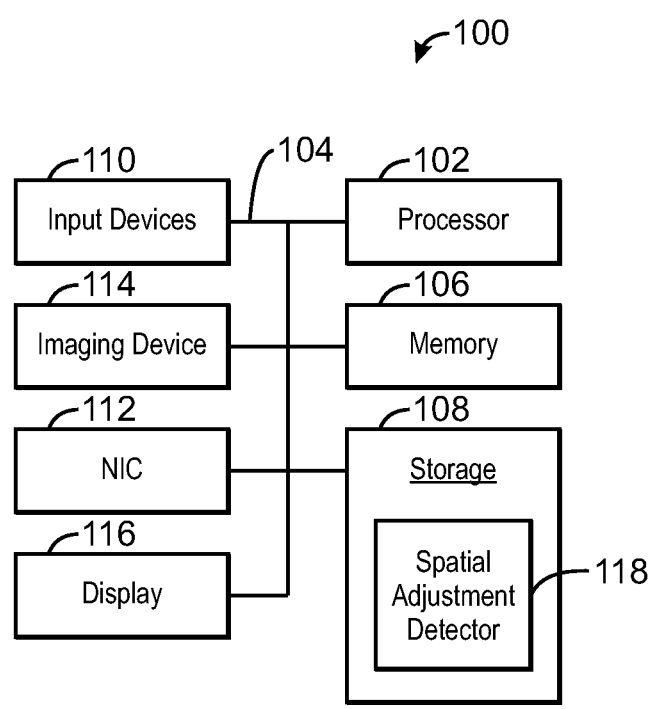
FIG. 1 is a block diagram of a computing device that may be used to determine whether an image contains spatial adjustments, in accordance with embodiments of the present invention.

FIG. 1 is a block diagram of a computing device that may be used to determine whether an image contains spatial adjustments, in accordance with embodiments of the present invention. The computing device is generally referred to by the reference number 100. Those of ordinary skill in the art will appreciate that the functional blocks and devices shown in FIG. 1 may comprise hardware elements including circuitry, software elements including computer code stored on a non-transitory, computer-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the computing device 100 may include a processor 102 connected through a bus 104 to one or more types of non-transitory, computer-readable media, such as a memory 106 that may be used during the execution of various operating programs, including operating programs used in embodiments of the present invention. The memory 106 may include read-only memory (ROM), random access memory (RAM), and the like. The computing device 100 can also include other non-transitory, computer-readable media, such as a storage system 108 for the long-term storage of operating programs and data, including the operating programs and data used in embodiments of the present invention. The storage system 108 may include, for example, a hard disk drive, an array of hard disk drives, an optical drive, an array of optical drives, a non-volatile memory, a universal serial bus (USB) drive, a digital versatile disk (DVD), a compact disk (CD), a flash drive, and the like.

The computing device 100 can also include one or more input devices 110, such as a mouse, touch screen, and keyboard, among others. The device 100 can also include a network interface controller (NIC) 112, for connecting the device 100 to a network through a local area network (LAN), a wide-area network (WAN), the Internet, or another network configuration. In an embodiment, the computing device 100 is a general-purpose computing device, for example, a desktop computer, laptop computer, business server, and the like.

The computing device 100 can also include, or be operatively coupled to, an imaging device 114, for example, an optical scanner, digital camera, and the like. The imaging device 114 may be used to capture images which may be processed according to the techniques described herein. Captured images may be stored to the memory 106 or the storage system 108. The computing device also includes a display 116. As used herein, the term "display" refers to any device that can display a visual image, for example, a computer monitor, an LCD screen, and the like.

The computing device 100 also includes a spatial adjustment detector 118 configured to determine whether an image contains spatial adjustments, in accordance with embodiments of the present invention. As described further below, the spatial adjustment detector 118 may be configured to determine whether an adjusted image contains spatial adjustment as compared to an original image. A method for determining whether an image contains spatial adjustments may be embodied on the non-transitory, computer-readable medium in the form of instructions that are executable by the processor 102. The method may include identifying a subset of pixels from the original image that all have the same color value. The pixels of the adjusted image that spatially correspond with the subset of pixels from the original image may be evaluated to determine whether the spatially corresponding pixels of the adjusted image also have the same color. In other words, the spatially corresponding pixels of the adjusted image will have the same color if they are represented by a single color value, regardless of whether that color value matches the color value of the original image. If the spatially corresponding pixels do not have the same color value then spatial adjustments have occurred. In an embodiment, the check for spatial adjustments may be performed through the use of hash keys, as explained further below in reference to FIG. 3

Figure 2:
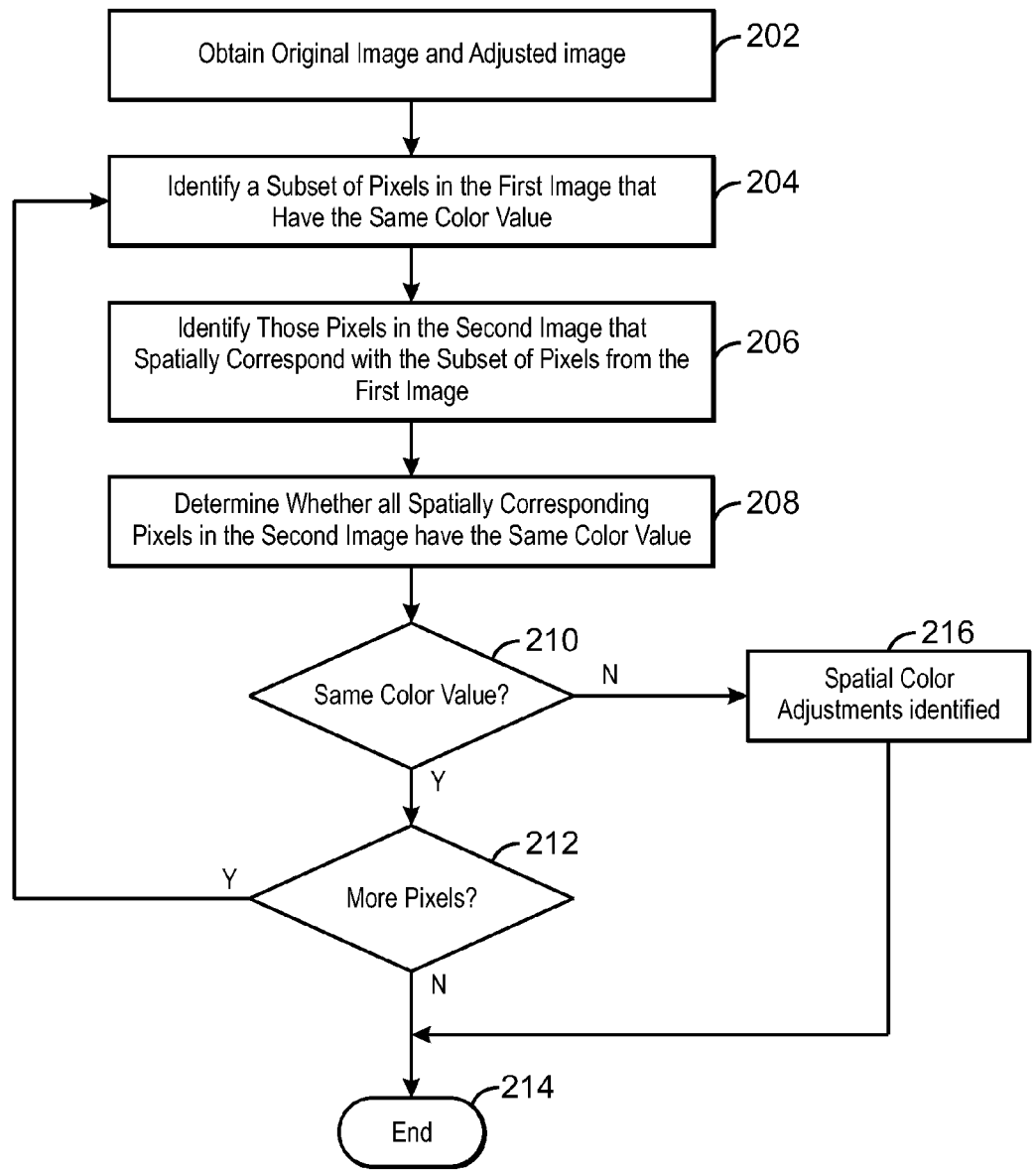
FIG. 2 is a process flow diagram of a method of determining whether an image contains spatial adjustments, in accordance with embodiments of the present invention.

FIG. 2 is a process flow diagram of a method of determining whether an image contains spatial adjustments, in accordance with embodiments of the present invention. The method is referred to by the reference number 200 and may be performed by the spatial adjustment detector 118. The method may begin at block 202 wherein an original image and an adjusted image are obtained. Both the original image and adjusted image may be encoded in any suitable color space, including device independent color spaces such as the CIE LAB profile connection space (PCS), as well as device or standard color spaces such as an RGB color space or a CMYK color space, among others. Each pixel of the original and adjusted image may be characterized by a multi-dimensional color coordinate having several corresponding color attributes, such as hue, saturation, brightness, and the like. The entire color coordinate corresponding to a pixel may be referred to as the pixel's "color value," and represents a point within the corresponding color space. Each pixel of each image may also be associated with a pixel location that represents the location of the pixel within the image. The location of each pixel may be not be explicitly labeled within the image file, but may be inherent in the pixels ordering within the image file.

The original image may be any type of digital image such as a photograph generated by the imaging device 114 or obtained through the network, for example, from the Internet. The original image may also be a test image supplied, for example, by a manufacturer of the display 116 to enable the discovery of a user's color preferences.

In an embodiment, the adjusted image is a derivative of the original image. In other words, the adjusted image may be an adjusted form of the original image. For example, a user of the computing device 100 may generate the adjusted image by applying color modifications to the original image to obtain an image that better suits the user's preferences for color reproduction on the display 116. The color adjustments may be generated through the use of an image processing tool such as Photoshop®, or a color management utility, for example, provided by a manufacturer of the display 116. The color modifications made to the original image may include changes to the hue or saturation level, contrast, exposure or tone curves and others. In some cases, the color modifications may be global, meaning that the color modifications are applied to the entire color space. In some cases, the color modifications may be local to a portion of color space, for example, modifying the saturation of the blues alone instead of modifying the saturation overall.

The user of the computing device 100 may also generate the adjusted image by applying spatial adjustments to the original image. Spatial adjustments are image adjustments that are applied to only a portion of the image rather than the image as a whole. For example, a color blue in one portion of the image may be adjusted, while the same color blue in another part of the image may be unadjusted or adjusted differently. A spatial adjustment may include red-eye reduction, air-brushing, or any other adjustment that is applied to a subset of pixels of the original image.

In an embodiment, the nature of the adjustments applied to generate the adjusted image are unknown. Further, in some cases, the adjusted image may not be even be derived from the original image. As used herein, the term "original image" is not meant to imply that the original image has never been modified. Rather, the term "original image" is merely intended to convey that the original image may be a previous version of the adjusted image, in other words, that the adjusted image might be a derivative of the original image.

At block 204, a subset of pixels having the same color value are identified in the original image. In an embodiment, the subset of pixels may be identified by obtaining a first pixel from the original image and searching the remainder of the original image to find all of the pixels with color values that match the color value of the first pixel. The pixel location for each pixel in the subset of pixels may be recorded, for example, to the memory 106 or storage 118. Further, all of the pixels in the subset of pixels may be flagged as processed so that pixels that have already been processed may be skipped during subsequent iterations of block 204. In an embodiment, a check may be made to ensure that the subset of pixels includes more than one pixel. If the subset of pixels does not include more than one pixel, the subset of pixels will not be useful for identifying spatial adjustments, in which case, the pixel may be flagged as processed and new subset of pixels may be obtained.

At block 206, those pixels in the adjusted image that spatially correspond with the subset of pixels identified in the original image may be identified. In other words, the spatially corresponding pixels will be those pixels in the adjusted image that have the same pixel location as the pixels in the subset of pixels generated at block 204 from the original image.

At block 208, a determination is made regarding whether all of the spatially corresponding pixels in the adjusted image at block 206 have the same color value. For example, a first spatially corresponding pixel from the adjusted image may be identified and the color value recorded. Each of the remaining spatially corresponding pixels may be evaluated to determine whether the color value of the remaining pixels matches the first pixel. In other words, no comparison is made between the color value of the original image and color values of the spatially corresponding pixels from the adjusted image.

At block 210, if the spatially corresponding pixels all have the same color value, no spatial color adjustments are detected and the process flow may advance from block 210 to block 212. At block 212, a determination is made regarding whether there are pixels in the original image that have not yet been flagged as processed. If there are pixels that have not been processed, the process flow may advance to block 204, wherein a new subset of pixels may be obtained and the above process repeated. Otherwise, if all of the pixels are flagged as processed, the process flow may advance to block 214 and terminate.

Returning to block 210, if any of the spatially corresponding pixels have a different color value, the process flow may advance from block 210 to block 216. At block 216, a spatial adjustment has been identified and an indicator may be set. If the method 200 is being operated in the context of modifying a color lookup table, the identification of the spatial adjustment may cause the color lookup table modification algorithm to terminate. In an embodiment, a warning message may be displayed to the user indicating the presence of spatial adjustments. In such an embodiment, the user may be given a choice to proceed to modify the lookup table despite the spatial adjustments. In such cases, the resulting color lookup table modification will be an average of the various spatial adjustments. For example, if a seaside picture has the blue of the ocean adjusted by boosting saturation while the blue sky remains unadjusted, the result might be an overall but milder boost of saturation of all blues.

In an embodiment, the specific subset of pixels in which the spatial adjustment was found may be recorded and the identified spatial adjustments may be displayed to a user. For example, the subset of pixels for which the spatial adjustment was detected may be indicated on a display of the image, such as by highlighting the pixels. As shown in FIG. 2, in an embodiment, the process flow may advance from block 216 to block 214 where the process flow terminates. In some cases, it may be useful to identify all of the spatial adjustments that have been made to an image. Thus, in an embodiment, the process flow may advance from block 216 to block 212, wherein a determination is made regarding whether there are additional pixels to be processed.

Figure 3:
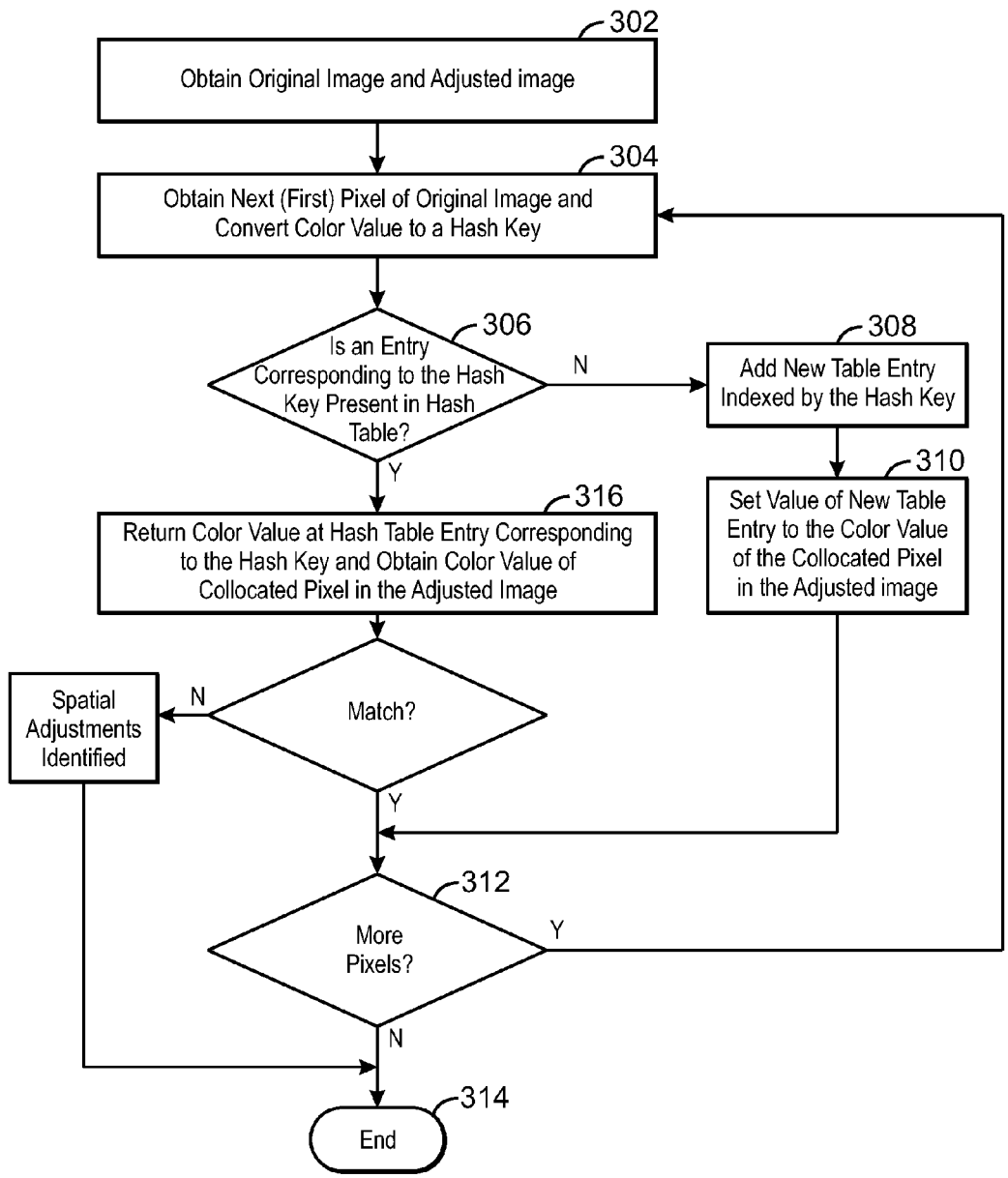
FIG. 3 is a process flow diagram of another method of determining whether an image contains spatial adjustments, in accordance with embodiments of the present invention.

FIG. 3 is a process flow diagram of another method of determining whether an image contains spatial adjustments, in accordance with embodiments of the present invention. The method is referred to by the reference number 300 and may be performed by the spatial adjustment detector 118. In accordance with embodiments, the method 300 may detect spatial adjustments by generating a hash table to store the adjusted pixel color values indexed by the original pixel color values. The method may begin at block 302 wherein an original image and an adjusted image are obtained, as discussed in reference to FIG. 2. Additionally, at block 302 the hash table may be initialized. In an embodiment, the hash table is initialized to an "empty" value, which can be, for example, a pixel color value of RGB (−1, −1, −1). In an embodiment, the hash table is initialized through the use of an additional flag that keeps the destination pixel in 8 bits.

At block 304, the next (first) pixel of the original image is obtained and the color value of the pixel is converted to a hash key. Any suitable hashing function or algorithm may be used to convert the pixel color value to the hash key. In embodiments, each pixel has a different index, thereby avoiding address clashes. In an embodiment, the hash key may be generated by the following hash function:

$$\text{Index} = F(r,g,b) = r \cdot 256 \cdot 256 + g \cdot 256 + b$$

In the above formula, "Index" equals the hash key into the hash table generated for a pixel of the original image, "r" equals the red component of the pixel color value, "g" equals the green component of the of the pixel color value, and "b" equals the blue component of the pixel color value.

At block 306, a determination is made regarding whether an entry corresponding to the hash key is present in the hash table. If the hash table does not have a corresponding entry, the process flow advances to block 308. At block 308, a new table entry is added to the hash table and indexed by the hash key. At block 310, the value of the new table entry is set to the color value of the pixel from the adjusted image that is collocated with the pixel obtained from the original image at block 304. The process flow then advances to block 312, wherein a determination is made regarding whether additional pixels are present in the source image that have not yet been processed. If more pixels are available, the process flow may return to block 304, wherein the next pixel is obtained. Otherwise, if no more pixels are available, the process flow advances to block 314 and the process flow terminates.

Returning to block 306, if an entry corresponding to the hash key is present in the hash table, the process flow may advance to block 316. At block 316, the color value is obtained from the hash table entry corresponding to the hash key. Additionally, the color value is obtained for the pixel in the adjusted image that is collocated with the pixel in the original image obtained at bock 304. At block 318, a determination is made regarding whether the two color values match. If the color values match, the process flow advances to block 312, and the process is reiterated for the next pixel if one is available. Otherwise, if the two color values do not match, the process flow advances to block 318 and a spatial adjustment has been identified.

What is claimed is:

1. A method of identifying spatial image modifications, comprising:
   receiving an original image and an adjusted image;
   identifying, by a processor, a first subset of pixels comprising pixels in the original image that have a same first color value, wherein the first subset of pixels are identified by obtaining a first pixel from the original image for the first color value, and searching the remainder of the original image to find pixels with color values that match the first color value of the first pixel;
   determining, by the processor, whether a second subset of pixels in the adjusted image all have a same second color value, wherein the second subset of pixels spatially correspond with the first subset of pixels; and
   identifying, by a spatial adjustment detector, a spatial adjustment, if the second subset of pixels do not all have the same second color value.

2. The method of claim 1, wherein identifying the first subset of pixels in the original image that have the same first color value comprises scanning the original image one pixel at a time and adding a new table entry to a hash table each time a new color value is encountered, wherein the new table entry is indexed by a hash key generated from the new color value and includes a color value of the collocated pixel in the adjusted image.

3. The method of claim 2, wherein determining whether the second subset of pixels in the adjusted image all have the same second color value comprises, each time an existing color is encountered during the scan of the original image, obtaining the color value from the hash table and comparing the color value to a color value of the collocated pixel in the adjusted image.

4. The method of claim 1, wherein identifying the first subset of pixels in the original image that have the same first color value comprises scanning the original image and recording a pixel location for each pixel in the first subset of pixels.

5. The method of claim 1, wherein determining whether the second subset of pixels in the adjusted image all have the same color value comprises identifying the second subset of pixels in the adjusted image and comparing the color values of each of the pixels in the second subset of pixels.

6. The method of claim 1, comprising modifying a color lookup table to capture color adjustments applied to the adjusted image if spatial adjustments are not detected.

7. The method of claim 1, comprising modifying a color lookup table to capture a weighted average of color adjustments applied to the adjusted image if spatial adjustments are detected.

8. The method of claim 1, comprising displaying an indication to a user, informing the user whether the adjusted image contains spatial adjustments relative to the original image.

9. A computer system, comprising:
a processor that is configured to execute non-transitory, computer-readable instructions; and
a memory device that stores instructions that are executable by the processor, the instructions comprising code configured to:
receive an original image and an adjusted image;
identify a first subset of pixels comprising pixels in the original image that have a same color value, wherein the first subset of pixels are identified by obtaining a first pixel from the original image for the first color value, and searching the remainder of the original image to find pixels with color values that match the first color value of the first pixel; and
determine whether a second subset of pixels in the adjusted image all have a same color value, wherein the second subset of pixels spatially correspond with the first subset of pixels;
wherein a spatial adjustment is identified if the second subset of pixels do not all have the same color value.

10. The computer system of claim 9, wherein the code configured to identify the first subset of pixels in the original image that have the same first color value causes the processor to scan the original image one pixel at a time and add a new table entry to a hash table each time a new color value is encountered, wherein the new table entry is indexed by a hash key generated from the new color value and includes a color value of the collocated pixel in the adjusted image.

11. The computer system of claim 10, wherein the code configured to determine whether the second subset of pixels in the adjusted image all have the same second color value is configured to cause the processor, each time an existing color is encountered during the scan of the original image, to obtain the color value from the hash table and comparing the color value to a color value of the collocated pixel in the adjusted image.

12. The computer system of claim 9, wherein the code configured to identify the first subset of pixels in the original image that have the same first color value causes the processor to scan the original image and record a pixel location for each pixel in the first subset of pixels.

13. The computer system of claim 9, wherein the code configured to determine whether the second subset of pixels in the adjusted image all have the same color value is configured to identify the second subset of pixels in the adjusted image and compare the color values of each of the pixels in the second subset of pixels.

14. The computer system of claim 9, comprising code configured to modify a color lookup table to capture color adjustments applied to the adjusted image if spatial adjustments are not detected.

15. The computer system of claim 9, comprising code configured to modify a color lookup table to capture a weighted average of color adjustments applied to the adjusted image if spatial adjustments are detected.

16. A non-transitory, computer-readable medium, comprising instructions configured to direct a processor to:
receive a original image and a adjusted image;
identify a first subset of pixels comprising pixels in the original image that have a same color value, wherein the first subset of pixels are identified by obtaining a first pixel from the original image for the first color value, and searching the remainder of the original image to find pixels with color values that match the first color value of the first pixel; and
determine whether a second subset of pixels in the adjusted image all have a same color value; wherein the second subset of pixels spatially correspond with the first subset of pixels;
wherein a spatial adjustment is identified if the second subset of pixels do not all have the same color value.

17. The non-transitory, computer-readable medium of claim 16, comprising instructions configured to scan the original image one pixel at a time and add a new table entry to a hash table each time a new color value is encountered, wherein the new table entry is indexed by a hash key generated from the new color value and includes a color value of the collocated pixel in the adjusted image.

18. The non-transitory, computer-readable medium of claim 17, comprising instructions configured to, each time an existing color is encountered during the scan of the original image, to obtain the color value from the hash table and comparing the color value to a color value of the collocated pixel in the adjusted image.

19. The non-transitory, computer-readable medium of claim 16, wherein the instructions configured to determine whether the second subset of pixels in the adjusted image all have the same color value is configured to identify the second subset of pixels in the adjusted image and compare the color values of each of the pixels in the second subset of pixels.

20. The non-transitory, computer-readable medium of claim 16, comprising instructions configured to modify a color lookup table to capture color adjustments applied to the adjusted image if spatial adjustments are not detected.

* * * * *